Oct. 21, 1969    H. E. McKNIGHT    3,473,463
COFFEE MAKER
Filed May 20, 1968    3 Sheets-Sheet 2
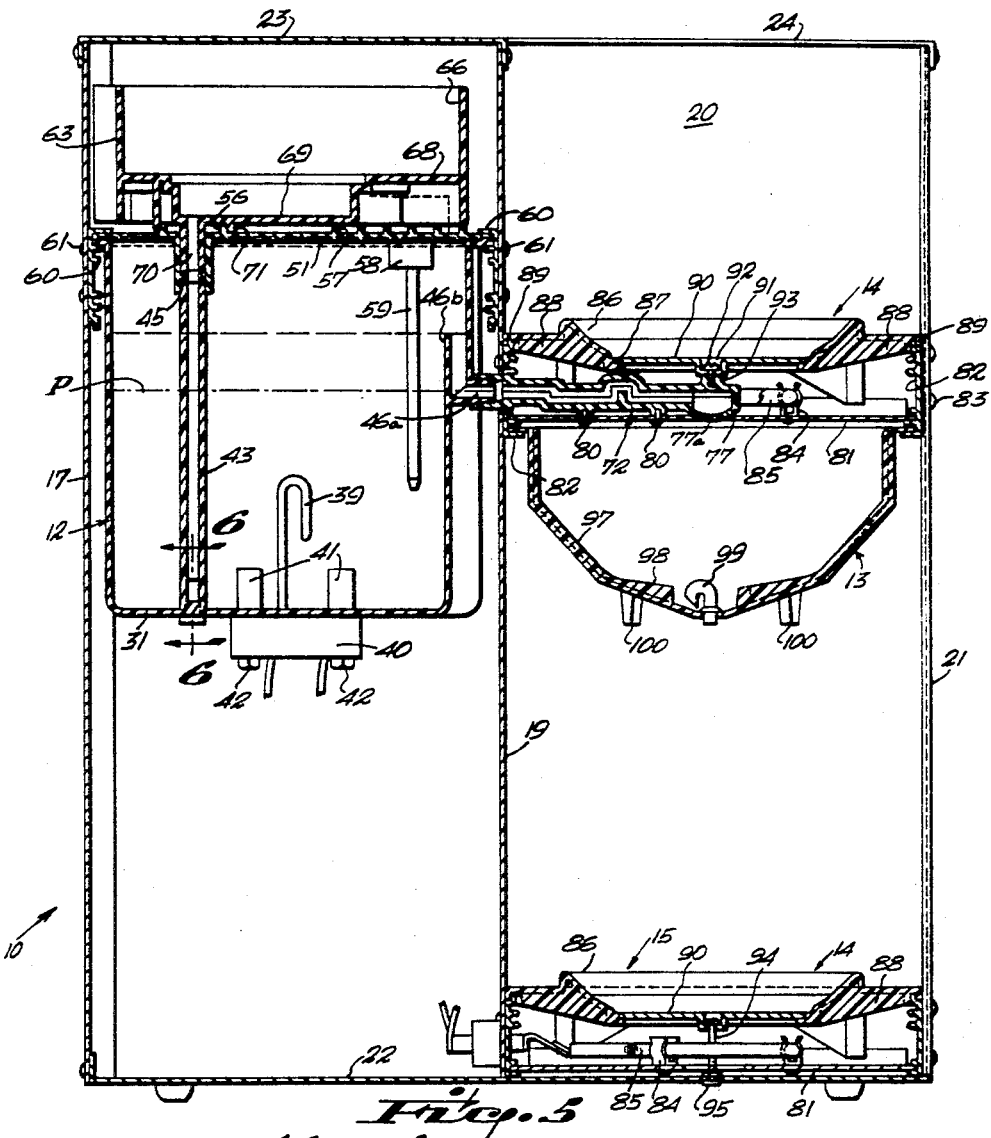
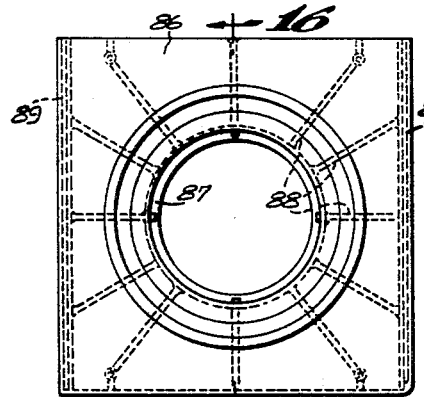
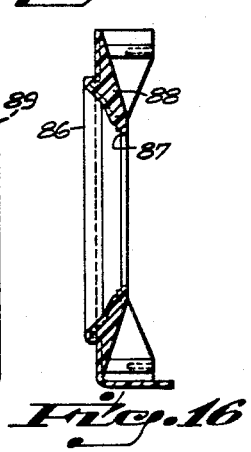
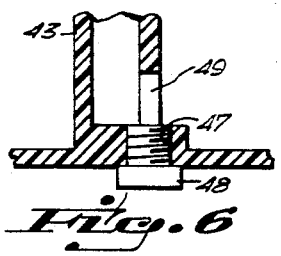
INVENTOR.
HERBERT E. McKNIGHT
BY
E.H. Schmidt
ATTORNEY.

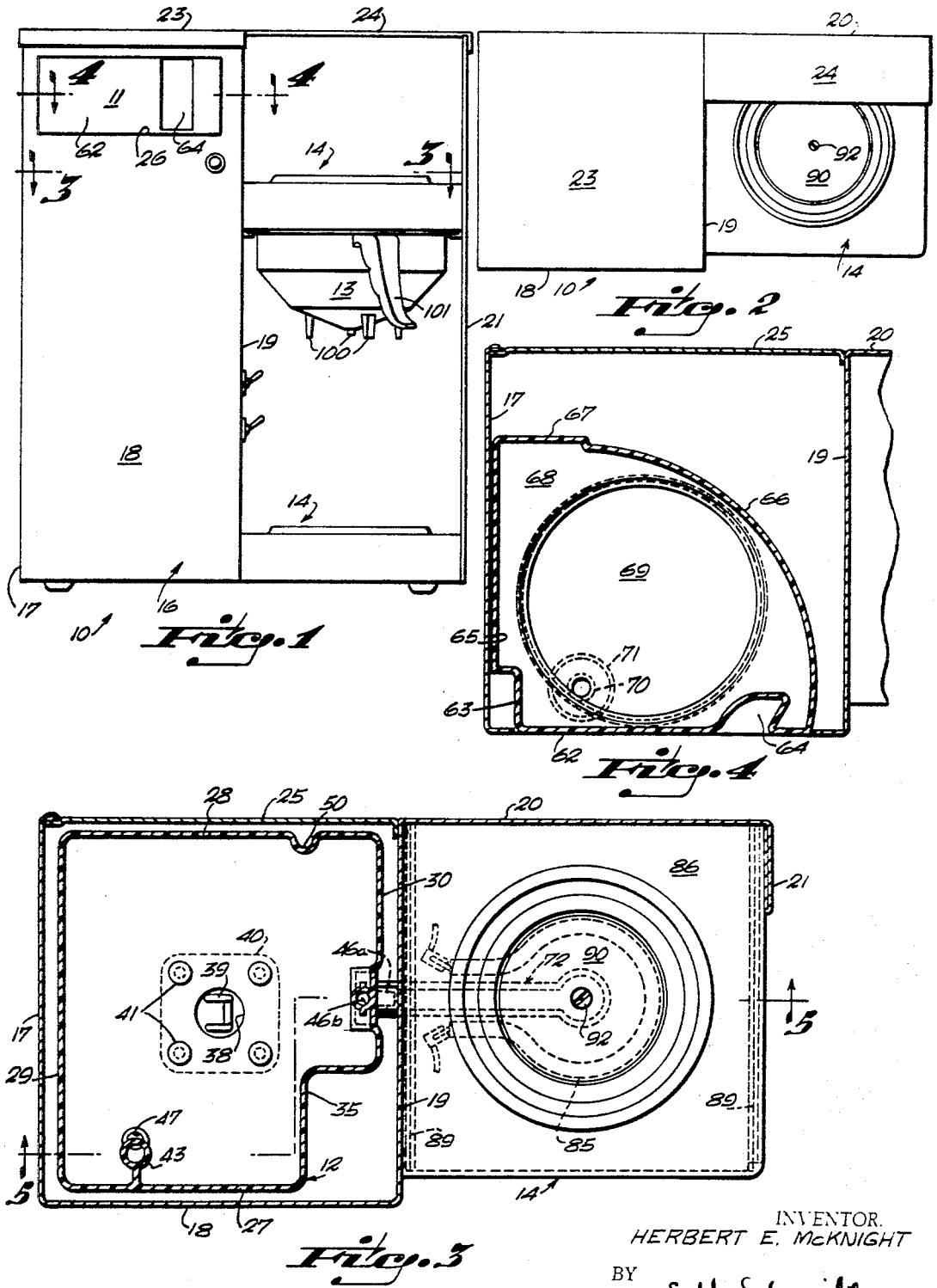

Oct. 21, 1969  H. E. McKNIGHT  3,473,463
COFFEE MAKER

Filed May 20, 1968  3 Sheets-Sheet 3

INVENTOR.
HERBERT E. McKNIGHT
BY E. H. Schmidt
ATTORNEY.

3,473,463
COFFEE MAKER
Herbert E. McKnight, incompetent, Hialeah, Fla., by James A. McKnight, guardian, 4517 Jefferson, Hollywood, Fla. 33021
Filed May 20, 1968, Ser. No. 730,682
Int. Cl. A47j *31/057*
U.S. Cl. 99—307                                                6 Claims

ABSTRACT OF THE DISCLOSURE

A coffee making machine of the type having a hot water reservoir, a ground coffee container and a conduit leading from the upper portion of the reservoir to the coffee container for the discharge therethrough of hot water from the reservoir upon its displacement by the addition of a new supply of cold water, wherein the reservoir is of a molded synthetic plastic construction having integrally formed therewith water inlet and outlet conduit means.

---

In my patent application Ser. No. 665,492, filed Sept 5, 1967, now abandoned, titled Coffee Making Equipment, there is described a portable device for automatically brewing coffee on a continuous basis as required to fulfill the needs of small businesses, large offices, snack bars, and the like where limited groups of persons assemble from time to time for coffee breaks. This invention relates to such coffee making equipment and has for its principal object the provision of a coffee maker of the character described the mechanism of which is greatly simplified and improved structure.

In my above-described patent application there is disclosed a coffee making apparatus including a hot water reservoir, a ground coffee container, and a conduit leading between the reservoir and the ground coffee container for the displacement, by a new supply of cold water, of the hot water from the reservoir to flow by gravity through the ground coffee container for brewing coffee. The present invention has for its principal object the improvement of such coffee makers by redesign of the reservoir and conduit structure to enable its being fabricated of a synthetic plastic material, thereby achieving heretofore unattained simplicity of manufacture and economy. More particularly the hot water reservoir system including the water inlet and outlet conduit is so designed as to be fabricated of only three injection molded, readily assembled parts.

Another object of the invention is to provide a novel and improved coffee maker of the above nature which will be easy to disassemble and reassemble for cleaning, which will be light in weight and, therefore, highly portable, and which will be dependable and long-wearing in operation.

Other objects, features, and advantages of the invention will be apparent from the following description when read with reference to the accompanying drawings. In the drawings, wherein like reference numerals denote corresponding parts throughout the several views:

FIG. 1 is a front elevational view of a coffee maker embodying the invention;

FIG. 2 is a top view thereof;

FIG. 3 is a horizontal cross-sectional view taken along the line 3—3 of FIG. 1 in the direction of the arrows;

FIG. 4 is a partial horizontal cross-sectional view taken along the line 4—4 of FIG. 1 in the direction of the arrows;

FIG. 5 is a vertical cross-sectional view taken along the broken line 5—5 of FIG. 3 in the direction of the arrows;

FIG. 6 is a vertical cross-sectional view taken along the line 6—6 of FIG. 5 in the direction of the arrows and illustrating mechanical details of the water inflow tube integrally molded in the hot water reservoir;

FIG. 15 is a top view of one of the coffee hot plate well members, shown separately; and FIG. 16 is a transverse cross-sectional view thereof taken along the line 16—16 of FIG. 15.

Figure 7:
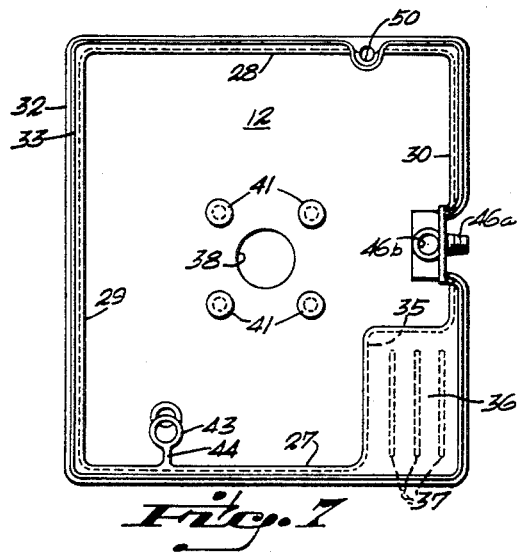
FIG. 7 is a top view of the integrally molded hot water reservoir or tank.

Referring now in detail to the drawing, the illustrated coffee maker embodying my invention, designated generally by reference numeral 10, comprises an integrally formed water support drawer 11, a hot water reservoir or tank 12, a coffee brewing bowl 13, and upper and lower hot plate wells 14 and 15, respectively, all supported in a common housing indicated generally at 16, fabricated of bent sheet metal, such as stainless steel. As best illustrated in FIGS. 1 through 5, the housing 16 is substantially rectangular in shape, being comprised of a left side wall 17, a front wall 18, a central side wall 19 in spaced parallel relation with respect to said left side wall, a back wall 20 in spaced parallel relation with respect to said front wall, and a right side wall portion 21 in spaced parallel relation with respect to said left side wall and said central side wall, all of which are, preferably, integrally formed by bending a single sheet of sheet metal. The bottom of the housing 16 is enclosed by a bottom panel 22 secured as with sheet metal screws or rivets. The top of the housing is similarly enclosed by a first top cover panel 23 fully enclosing that area between left and central sidewalls 17 and 19, respectively, and a second top cover panel 24 enclosing a marginal back portion only of that area between central side wall 19 and the right side wall portion 21. The rear opening between the left and central side walls 17 and 19, respectively, and a second top cover panel 24 enclosing ber 25 permitting access for assembly and repair of the hot water reservoir and associated mechanism, as is more particularly hereinbelow described. The front wall 18 is provided, near the upper end thereof, with a laterally-extending rectangular opening 26, through which the water supply drawer 11 moves for supply new water to the coffee maker, as is hereinafter more particularly described.

Figure 8:
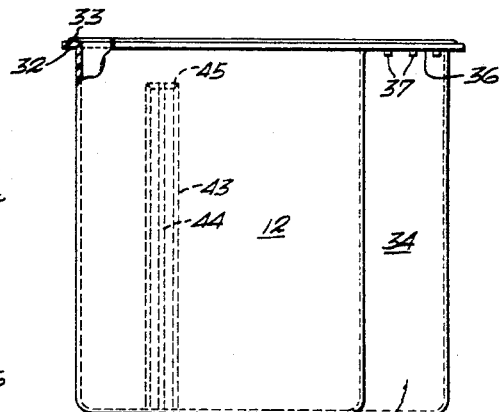
FIG. 8 is a front elevational view thereof.

The hot water tank 12, shown separately in FIGS. 7 and 8, is integrally molded of a tough synthetic plastic material, and is so constructed, as presently herein described, to permit single step formation by the injection molding process. To this end the tank 12 is substantially rectangular in shape being formed with front and back walls 27 and 28, respectively, left and right side walls 29 and 30, respectively, and bottom wall 31. The upper end of the tank 12 is formed with a substantially rectangular, outwardly-extending flange or lip 32, along the upper side of which there is provided a rounded, upwardly-projecting bead 33. The front wall 27, at the left side thereof, as illustrated in FIGS. 3 and 8 is formed with an inwardly-offset portion 34 defining a top to bottom recess 35 affording room within the housing for associated electric wiring and the like. The upper end of the recess 35 is defined by an upper end wall portion 36, the underside of which is molded with a plurality of spaced strengthening ribs 37. The bottom wall 31 of the water tank 12 is provided with a central opening 38 for the reception thereto of the heating element 39 of an electrical heating device 40, (see FIGS. 3 and 5). For securing the heating device 40 in place, the interior of the water tank bottom wall 31 is integrally formed with a plurality of upstanding bosses 41 into which attachment bolts 42 can be threaded.

As means for supplying replacement water to the bottom interior of the hot water reservoir or tank 12, said tank, as illustrated in FIGS. 5, 7 and 8, has integrally molded therewithin, at the left side near the front, a water inflow tube 43, strengthened by a vertical web 44 connected with the front wall 47. As illustrated in FIG. 8, the inflow tube 43 extends somewhat short of the upper end of the reservoir, and has its upper end integrally chamferred, as indicated at 45, for the purpose hereinafter appearing.

Integrally formed discharge port means is provided in the hot water reservoir or tank 12 for the outflow of hot water during a coffee making cycle of operation. To this end, as a unique feature of construction permitting the hot water tank or reservoir 12 to be formed in a single step injection molding process, the right side wall 30 is formed with a vertical recess 46 extending approximately one-half way up from the bottom of said wall and terminating in an outwardly-extending nipple 46a the outer end of which is substantially flush with the outer edge of the upper lip or flange 32. As best illustrated in FIGS. 5 and 7, the inner end of the nipple 46a communicates, at the inside of the hot water reservoir or tank 12, with a short, upwardly-extending, integrally-molded overflow tube 46b.

As best illustrated in FIG. 6, the bottom wall 31 of the tank 12 is drilled and threaded, as indicated at 47, to receive a removable drain plug 48. The opening 47 is so located and so drilled as to cut away a lower end portion of the water inflow tube 43 to provide an opening 49 at the lower end of said tube through which cold water will be discharged into the bottom of the reservoir during a coffee-making cycle of operation.

Figure 9:
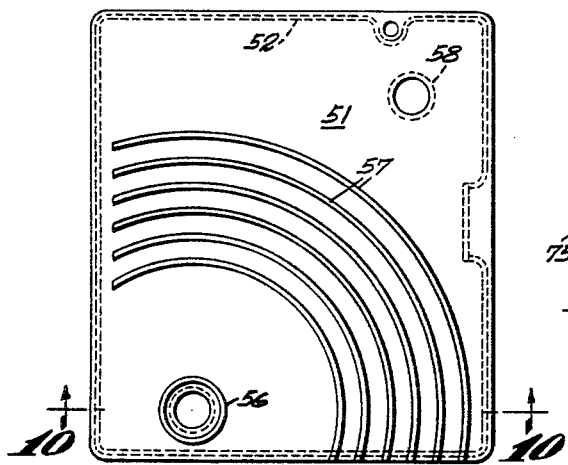
FIG. 9 is a top view of the hot water reservoir, shown with the integrally molded top cover member cemented in place.

Referring to FIGS. 3, 7 and 9, it will be seen that the rear wall 28 of the hot water tank 12 is formed with a top-to-bottom groove 50 for the passage of electric wiring in the assembly of the coffee maker.

Referring to FIG. 5, the letter P designates the parting line of a two part mold enabling the fabrication of the hot water reservoir of tank 12 in a single step injection molding process. As a salient feature, it will be noted that the parting or separation plane of the mold passes axially through the nipple 46a, permiting integral formation thereof with the side walls and overflow tube 46b of the tank.

Figure 10:
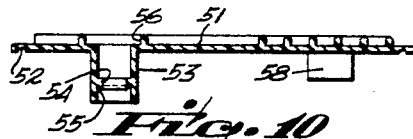
FIG. 10 is a transverse cross-sectional view of the reservoir cover member, as taken along the line 10—10 of FIG. 9 in the direction of the arrows.

The hot water tank 12 is provided with a tank cover member 51, also molded of a tough synthetic plastic material, and formed in its underside with a peripheral groove 52 to receive, in seating engagement therein, the upwardly-extending bead 33 of said tank when assembled thereto. The cover member 51 is formed with a downwardly-extending tubular sleeve 53 (see FIG. 10) having an interior annular flange 54 integrally formed therein near its lower end. The underside of the interior flange 54 is formed with an annular undercut portion or recess 55 adapted to receive the chamferred upper end of the water inflow tube 43 (see FIG. 5). The upper surface of the tank cover member 51 is formed with an upwardly-extending circular boss 56, concentric with the tubular sleeve 53. As best illustrated in FIG. 9, concentric arcuate ribs 57 are formed in the upper surface of the tank cover member 51, providing anti-friction bearing surfaces for the water supply drawer, as is hereinafter described. As illustrated in FIGS. 5 and 9, the tank cover member 51 is also formed with a downwardly-skirted tubular opening 58, diagonally opposite the tubular sleeve 53, for the reception and assembly thereto of a thermostat 59.

As illustrated in FIG. 5, the hot water tank 12 with its assembled tank cover member 51 is supported within the housing 16 by a pair of channel support members 60 secured in opposing relation against the left side and central side walls thereof as by rivets 61.

As best illustrated in FIGS. 4 and 5, the water supply drawer 11, which is also preferably molded of a tough synthetic plastic material, comprises an upstanding front wall portion 62 having, at its left-hand side as seen in FIG. 4, a corner recess 63, and at its right hand side, a finger groove 64. The water drawer 11 is further formed with a straight side wall portion 65 and an arcuate wall portion 66 having an outwardly-offset portion 67 near the end thereof joining with said side wall portion. The bottom wall 68 of the water supply drawer 11 is formed with a cylindrical well portion 69 having an eccentrically-located, downwardly-extending nipple 70. The underside of the cylindrical well portion 69 is formed with a short, downwardly-extending, circular protrusion or boss 71, concentric with the nipple 70 and of such length and diameter as to be received over the outside of the upwardly-extending boss 56 of the tank cover member 51 when said water supply drawer is assembled upon the hot water tank assembly as illustrated in FIG. 5. In this connection it will be seen that, as so assembled, the downwardly-extending nipple 70 will fit slidingly within the tubular sleeve 53 of the tank cover member 51 to be journalled thereat for outward swinging of the drawer 11 through the housing opening 26 (see FIG. 1) for supplying cold water to the coffee maker.

Figure 11:
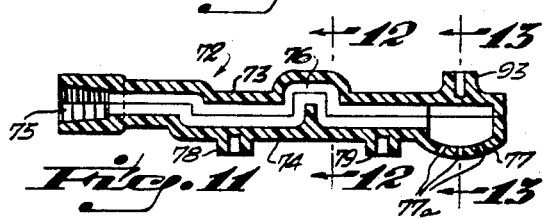
FIG. 11 is a longitudinal cross-sectional view of the hot water dispensor conduit member, shown separately.
Figure 12:
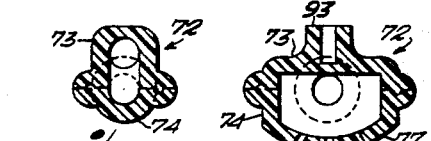
FIG. 12 is a vertical cross-sectional view of the hot water dispenser conduit member, taken along the line 12—12 of FIG. 11 in the direction of the arrows.
Figure 13:
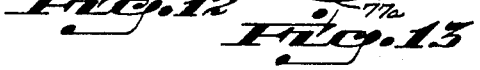
FIG. 13 is a vertical cross-sectional view of the hot water dispenser conduit member, taken along the line 13—13 of FIG. 11 in the direction of the arrows.
Figure 14:
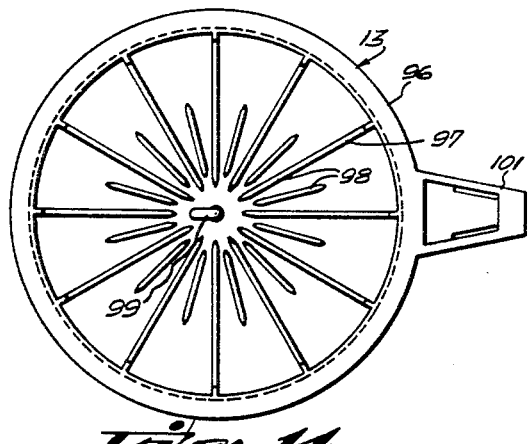
FIG. 14 is a top view of the integrally molded brewing bowl through which the hot water flows in the process of steeping or brewing coffee.

As conduit means as supplying hot water discharged by replacement from the hot water tank 12 to the coffee brewing bowl 13, there is provided a hot water discharge conduit member 72. As is best illustrated in FIGS. 11, 12 and 13, the hot water discharge conduit member 72, which is also preferably formed of tough synthetic plastic material, comprises integrally molded upper and lower half-shell members 73 and 74, respectively, cemented together to provide a unitary structure. As illustrated FIG. 11, the hot water discharge conduit member 72 is provided with an internal pipe thread 75 adapted for connection to the exteriorly pipe-threaded nipple 46a of the hot water tank 12 (see FIG. 5). The conduit member 72 is formed along its length with an inverted, U-shaped flow portion 46 extending into a spray discharge end portion 77 having downwardly and outwardly-extending spray discharge openings 77a. The conduit member 72 is also formed along its underside and at opposite sides of the U-shaped portion 76 with downwardly-extending bosses 78 and 79 receiving screws 80 (see FIG. 5) for the attachment of a centrally-apertured metal support plate 81. As further illustrated in FIG. 5, the support plate 81 is secured in place between the central side wall portion 19 and the right side wall portion 21 of the housing 16 by means of channel support members 82 fixed thereagainst in opposing relation as by screws 83. Metal clips 84 fixed to and extending upwardly of the support plate 81 support an arcuate electric heater element 85 for heating from below the upper hot plate well 14.

The hot plate well 14, as best illustrated in FIGS. 5, 15 and 16, comprises a substantially rectangular integrally molded well member 86 formed with a central circular well opening adapted to receive seated thereon a hot coffee decanter or flask (not illustrated). The lower end of the central opening of the well member 86 is formed with an annular seat 87, and the underside of said well member is strengthened with a plurality of radially-extending ribs 88. The opposed left and right hand sides of the well member 86 are formed with front-to-back rail portions 89 adapted to be received in opposed grooves provided in the channel support members 82 for securing the hot plate well 14 above the arcuate electric heater element 85. As further means for securing the hot plate well 14 in place and with respect to the hot water discharge conduit member 72, a circular bottom plate 90 seated within the seat 87 has a recessed central opening 91 through which extends a screw 92 threaded within a boss 93 formed in the hot water discharge conduit member 72 above the spray discharge end portion 77 thereof.

As illustrated in FIG. 5, the lower hot plate well 15 is identical in structure with that of the well 14, being similarly supported in place between the central side wall 19 and the right side wall 21 near the lower ends thereof, and secured in place by a machine screw 94 threaded into a nut 95 affixed to the bottom panel 22 of the housing.

As illustrated in 1, 5 and 14, the coffee brewing bowl 13, which is also preferably integrally molded of a tough synthetic plastic material, is formed with an outwardly-extending lip or flange portion 96 of such diameter as to be slidingly received within opposed grooves provided by the channel support members 82 at the lower ends thereof. The coffee brewing bowl 13 has a plurality of shallow, interior, radially-extending ribs 97 interspaced, at the bottom of said bowl, with a plurality of substantially deeper bottom ribs 98. Centrally located in the bottom of the coffee brewing bowl 13 is an inverted, U-shaped syphon tube 99 through which brewed coffee can flow into a flask or decanter (not illustrated) resting on the lower hot plate well 15. It is to be understood that, in use of the coffee making machine, a filter cup containing ground coffee will be placed within the coffee brewing bowl, through which coffee will filter before flowing out through the anti-drip syphon tube 99.

The coffee brewing bowl is also formed with downwardly-extending legs 100 for resting on a flat surface, and an outwardly and downwardly-extending handle 101 as a means by which it can readily be removed from and replaced in position under the hot water discharge conduit 72.

In use, drawer 11 will be swung open and a predetermined amount of fresh water poured therein, after which the drawer will be closed. As described above, the cold water will flow through inflow tube 43 into the bottom of the hot water tank 12 through tube opening 49. The electric heater element 39, energized through electric circuitry described in detail in my above-described patent application and therefore not further detailed herein, is heated to boiling temperature as indicated by a signal light (associated in its operation with the thermostat 59). A fresh supply of clean water will then be poured into drawer 11, as heretofore described, which water will displace the previously heated water, causing the hot water to flow through overflow tube 46 and out through the spray discharge end 77 of the hot water discharge conduit 72. The small streams of hot water flowing from the spray head will flow through the ground coffee contained in the filter element placed within the bowl 13. When the water reaches the bottom of the bowl, the coffee will have been properly steeped or brewed and filtered. The coffee then flows freely from the brewing bowl 13 through the anti-drip syphon tube 99 into the coffee decanter or flask previously placed on the lower hot plate well 15.

During the time that the new coffee is being brewed as described above, the newly-added supply of fresh cold water will automatically be heated to boiling temperature, ready for making the next flask of coffee.

Having thus described my invention, what I claim as new, and desire to protect by Letters Patent is:

1. A coffee maker comprising, in combination, a housing, an open-topped water supply container mounted within said housing, a water tank secured within said housing and arranged below said water supply container, means for heating water in said water tank, said water tank being integrally molded with a sidewardly-extending water outflow nipple, a vertically-extending tubular overflow tube integrally molded in said water tank and communicating at its lower end with the inner end of said water outflow nipple, a hot water discharge conduit connected at one end with said outflow nipple and having a downwardly-extending spray head at its outer end, a brewing bowl adapted to receive a charge of ground coffee, removably mounted with respect to said housing below said spray head, an orifice in the bottom of said brewing bowl for the discharge of brewed coffee, and water inflow means communicating between said water supply container and said water tank for feeding a fresh quantity of cold water supplied to said water container into the bottom of said water tank.

2. A coffee maker as defined in claim 1 wherein said water inflow means comprises an upstanding inflow tube integrally molded within said water tank and formed with a side opening at its lower end communicating between the lower end of said inflow tube and the interior of said tank at the bottom thereof.

3. A coffee maker as defined in claim 2 including a drain plug opening in the bottom of said tube in vertical alignment with said side opening of said inflow tube, and a drain plug removably fitted in said drain plug opening.

4. A coffee maker as defined in claim 2 including an integrally molded tank cover member fixed upon the upper end of said water tank and having a downwardly-extending, tubular sleeve received over the upper end of said water inflow tube, said water supply container being seated atop said tank cover member and having integrally formed therewith an eccentrically-located, downwardly-extending tubular nipple rotatively journalled and communicating with respect to an upper end portion of said downwardly-extending tubular sleeve.

5. A coffee maker as defined in claim 4 including a side wall opening in said housing for the outward rotary passage of said water container.

6. A coffee maker as defined in claim 5 wherein said hot water discharge conduit is formed, centrally along its length, within an inverted, U-shaped flow path for minimizing after-drip.

References Cited

UNITED STATES PATENTS

| | | | |
|---|---|---|---|
| 3,220,334 | 11/1965 | Martin | 99—282 |
| 3,336,856 | 8/1967 | Martin | 99—307 |
| 3,354,810 | 11/1967 | Lorang | 99—282 |
| 3,366,034 | 1/1968 | Karlen | 99—295 |

ROBERT W. JENKINS, Primary Examiner

U.S. Cl. X.R.

99—288